United States Patent [19]

Harvey

[11] 3,806,797
[45] Apr. 23, 1974

[54] DEVICES FOR TESTING THE ACID OR ALKALINE CONTENT OF LIQUIDS

[76] Inventor: Kenneth G. Harvey, 4340 Old William Penn Hwy., Monroeville, Pa. 15146

[22] Filed: May 28, 1971

[21] Appl. No.: 148,084

[52] U.S. Cl.................. 324/30, 324/115, 324/149, 324/154 PB, 324/156
[51] Int. Cl....... G01n 27/42, G01r 1/04, G01r 1/08
[58] Field of Search........ 324/29.5, 30, 29, 65, 156, 324/154, 72.5, 149, 115; 116/129

[56] References Cited
UNITED STATES PATENTS

| | | | |
|---|---|---|---|
| 1,707,051 | 3/1929 | Colosoff | 324/72.5 UX |
| 1,970,232 | 8/1934 | Hady | 324/72.5 UX |
| 2,524,841 | 10/1950 | Simkins | 324/72.5 X |
| 3,040,698 | 6/1962 | Gray | 116/129 |
| 3,513,392 | 5/1970 | Szajerski | 324/72.5 X |
| 3,510,766 | 5/1970 | Russell et al. | 324/149 X |
| 3,612,999 | 10/1971 | Bergero | 324/149 |
| 3,037,920 | 6/1962 | Vixler | 204/197 X |
| 1,502,928 | 7/1924 | Thompson | 324/29.5 |
| 3,161,823 | 12/1964 | Uithoven | 324/29 |
| 3,259,840 | 7/1966 | Schaschl et al. | 324/29 |
| 2,640,976 | 6/1953 | Prohaska | 324/29 X |
| 1,910,021 | 5/1933 | Legg | 324/65 R |
| 2,870,404 | 1/1959 | Oxley | 324/65 R |
| 1,426,868 | 8/1922 | Haskins | 324/29.5 |
| 2,775,736 | 12/1956 | Pies et al. | 324/156 X |
| 1,601,383 | 9/1926 | Todd | 324/30 R |

Primary Examiner—Gerard R. Strecker
Attorney, Agent, or Firm—Michael Williams

[57] ABSTRACT

A device for testing the acid or alkaline content of fluids, particularly fluids such as coolant in the radiator, and oil in the crankcase of an engine. The testing device includes a meter which is sensitive to small galvanic currents in the liquid of an engine radiator or crankcase and further includes a temperature indicating means to indicate the temperature of the fluid, and current regulating means to adjust the meter for variations in fluid temperatures.

In one form, the testing device includes a clamp for connection to the radiator of an engine, and a rod for insertion in the liquid in the radiator, the clamp and rod being in electrical circuit with the meter.

In another form, a sample of liquid to be tested is withdrawn into a container, the latter having spaced plates of dissimilar metals which cooperate with the electrolyte formed by the withdrawn liquid sample to generate galvanic currents which are indicated by the testing device.

2 Claims, 7 Drawing Figures

PATENTED APR 23 1974 3,806,797

INVENTOR.
KENNETH G. HARVEY
BY Michael Williams
ATTORNEY

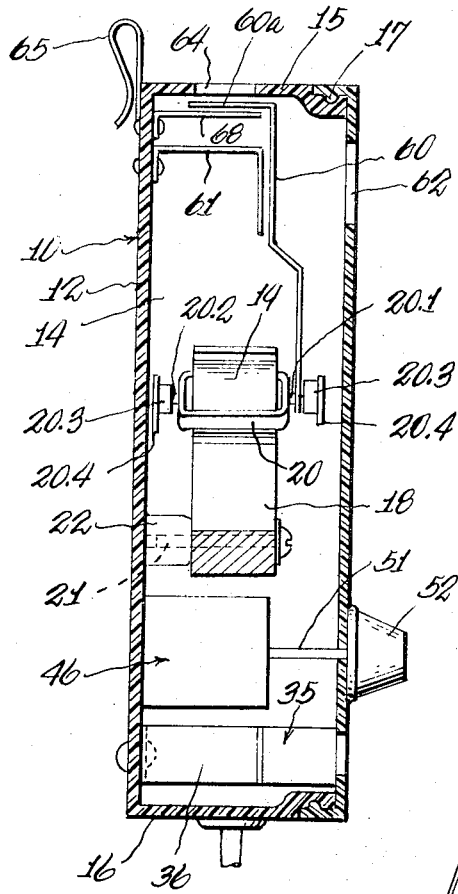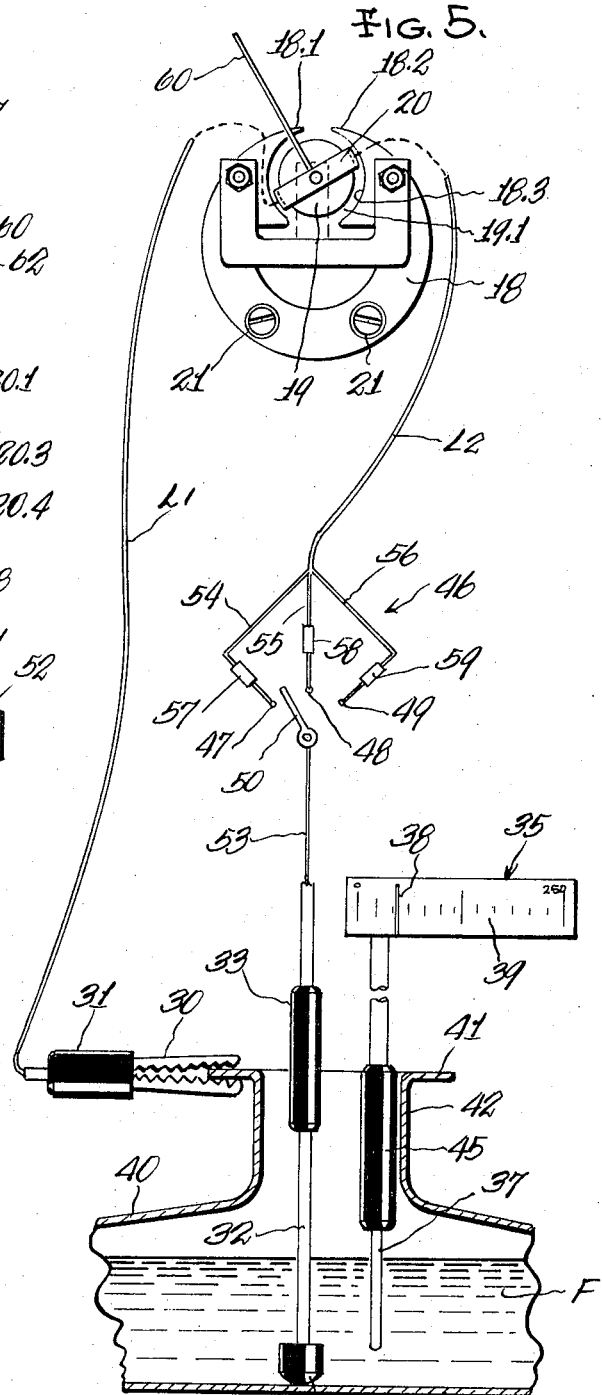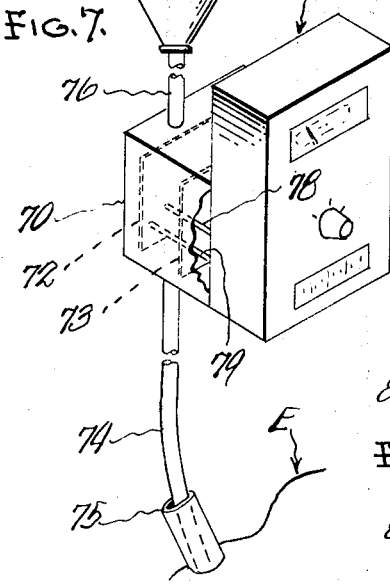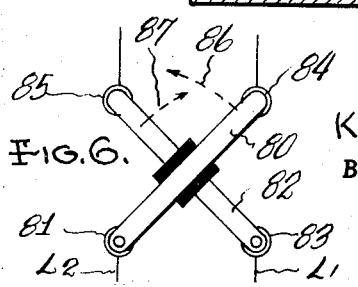

DEVICES FOR TESTING THE ACID OR ALKALINE CONTENT OF LIQUIDS

BACKGROUND AND SUMMARY

It is a well known fact that many problems have been created by corrosive substances contained with the cooling liquid or lubricating oil of an engine, such as that of an automobile. For example, the radiator of the auto engine has been caused to leak, or plug, by corrosive action of substances in the engine cooling system. Further hose connections in the cooling system have been affected by corrosive action and since such action usually occurs within the hose connection, no exterior condition is visible to indicate that a connection may fail, and failure on the road requires expensive service charges. Further, corrosive matter in the engine lubricating oil may seriously affect bearing material or oil passages, and may cause damage to the engine.

My invention makes it possible for the owner of an automobile to check, or have checked, the cooling liquid or lubricating oil of the engine to determine the hydrogen ion concentration (or pH value) thereof. Through use of my invention, the check may be made as easily as checks are now made to determine the antifreeze condition of the coolant, and therefore may be made periodically so that dangerous conditions may be avoided by proper attention. Although specific reference is made to the engine of an automobile, it will be appreciated that all other comparable types of engines may be tested. Further, through use of an embodiment of my invention, solution in any type of container may be checked.

DESCRIPTION OF THE DRAWINGS

In the drawings accompanying this description and forming a part of this specification there are shown, for purpose of illustration, embodiments which my invention may assume, and in these drawings:

FIG. 4 is a longitudinal sectional view, showing the interior of the device, FIG. 5 is a separated, schematic representation of parts of the device, and showing connection to the radiator of an engine, FIG. 6 is a fragmentary view of a detail, and FIG. 7 is a fragmentary perspective view of another embodiment of my invention.

DESCRIPTION OF PREFERRED EMBODIMENT

Figure 1:
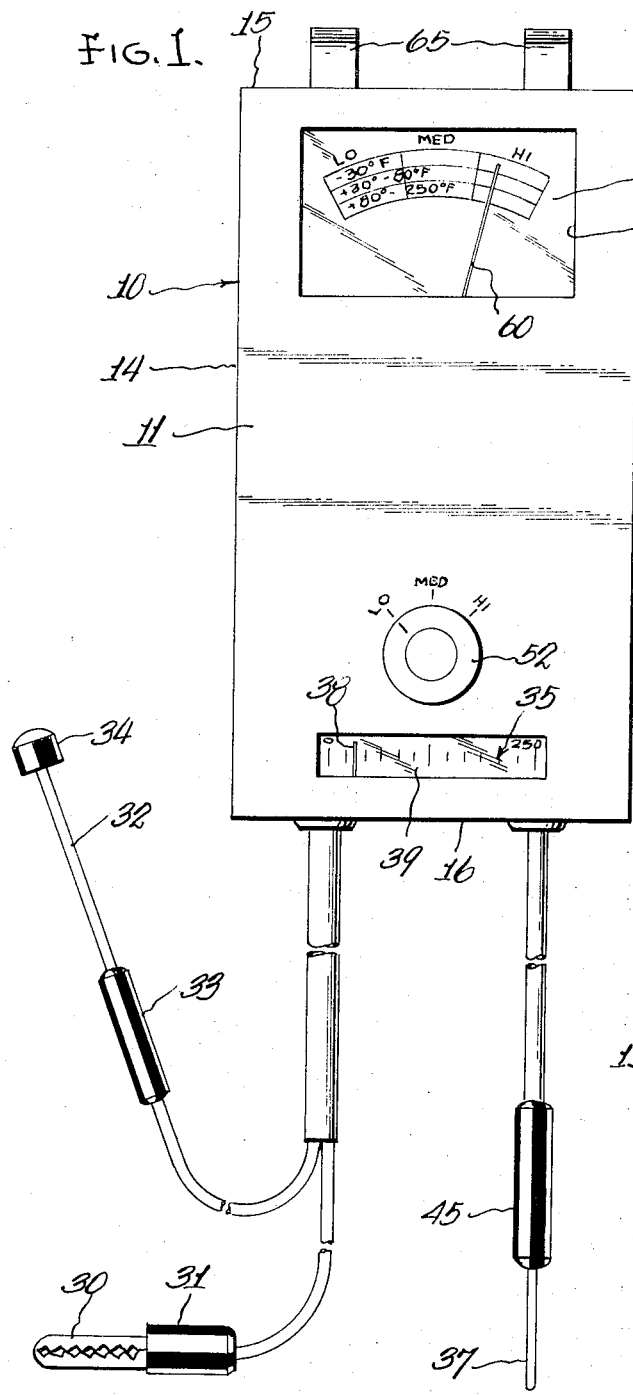
FIG. 1 is a front elevational view of a testing device in accordance with one embodiment of my invention.
Figure 2:
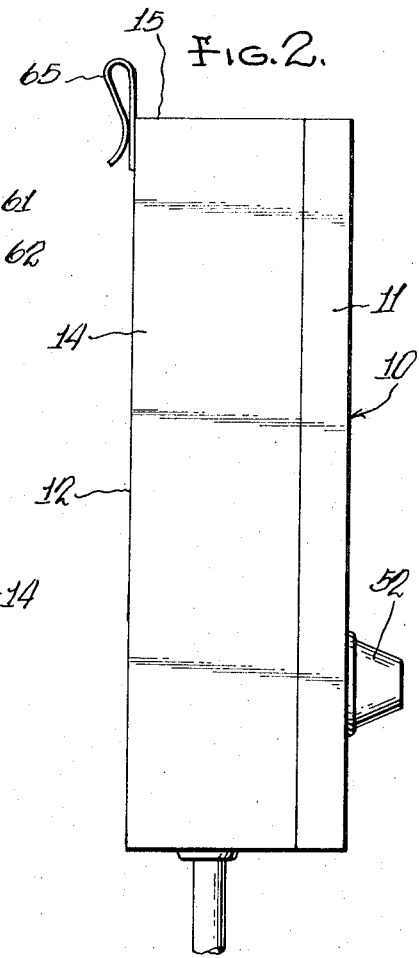
FIGS. 2 and 3 are side and top views, respectively, of the device.

The embodiment of the invention herein disclosed is housed in a box-like case 10 which is closed by a cover 11, both of which may be formed of a suitable plastic material which will withstand usage in a garage, or service station, repair shop, or by car owners. The case has a back wall 12, side walls 14—14, and top and bottom walls 15, 16, respectively. The cover is removably secured to the case 10 to close its front opening and in the present embodiment the cover has ribs 17 (see FIG. 4) which snap into complementary recesses in the walls of the case 10. All of the operating mechanism of my invention is carried by the case 10 and is readily accessible when the cover 11 is removed.

A sensitive meter is supported from the back wall 12 of the case 10, and may take the form of any one of several meters available on the market. An example of a meter which may be used is disclosed in the Manual Of Electric Instruments, distributed by the General Electric Company. Section 1 of this manual is devoted to permanent-magnet moving-coil instruments and pages 14 and 15 disclose a meter of the type herein disclosed. The meter per se forms no part of this invention and therefore it is disclosed only in general manner.

With reference to FIGS. 4 and 5, the meter comprises a permanent magnet 18 having pole portions 18.1, 18.2 defining a substantially circular opening 18.3. A cylindrical core 19 is fixed within the opening 18.3 and defines a circular space 19.1 therewith. Rotatable within the space 19.1 is an armature coil 20 having shafts 20.1, 20.2 extending from opposite sides thereof, the shafts being rotatable in bearings, shown generally at 20.3, which are carried by brackets 20.4 supported by but insulated from the magnet 18. The magnet may be secured to the back wall 12 of the case 10 by means of bolts 21 which are threaded into bosses 22 extending inwardly from the back wall.

The magnet 18, core 19 and armature coil 20 in effect form a small electric motor (such for example, as in a millivoltmeter) wherein the armature is rotated upon influence of electric currents of small magnitude. Opposite ends of the armature coil 20 are connected to lines L1 and L2 (see FIG. 5). The line L1 is electrically connected to an alligator clamp 30 having a rubber protecting boot 31, and the line L2 is electrically connected to a nickel brass or magnesium rod 32 having a rubber protecting boot 33. The free end of the rod 32 has a rubber tip 34 for a purpose to be disclosed.

A thermal indicating device 35, such as a thermometer, is supported from the back wall 12 of the case 10, as by means of a bracket 36. A capillary tube 37 forms a probe to be inserted into liquid to be tested and contains the usual fluid which moves an indicating needle 38 along the scale 39 of the indicating device 35 to indicate the temperature of the liquid being tested.

My invention is particularly adapted to indicate the acid or alkaline content of liquid in a metal container, and particularly the liquid within the radiator of an engine such as used in automobiles, stationary engines and the like. In FIG. 5, the top portion of an automobile radiator 40 is fragmentarily shown. The alligator clamp 30 is shown as clamped onto the lip 41 which receives the radiator closure cap (not shown). The rod 32 is shown as extending into the filler neck 42 of the radiator and is in contact with the liquid F contained therein. The usual radiator has a wall 43 defining an upper radiator space and the rubber tip 34 is provided on the free end of the rod 32 to insulate the latter from the wall 43. The rubber boot 33 insulates the rod 32 from contact with the filler neck 42. The probe 37 is also shown in FIG. 5 as being disposed through the filler neck 42 of the radiator and is in contact with the liquid F. A rubber boot 45 protects the probe 37 from contact with the filler neck 42 so that the probe is influenced only by the temperature of the liquid F.

The relation of parts shown in FIG. 5 represent the connections made by a person to test the liquid in the radiator, and it will be apparent that such connections may be made in a minimum of time. If the radiator liquid has an appreciable acid content, the liquid will act as an electrolyte, such as in a storage battery, and a galvanic current flow will be established in the circuit including the rod 32, the line L2, the turns of the armature coil 20, the line L1, the alligator clamp 30, the metal of the radiator, the liquid F (which forms the electrolyte), and back to the rod 32. Such galvanic current flow will cause the armature coil 20 to rotate.

The galvanic current generated in the above-mentioned circuit is proportional to the temperature of the electrolyte and it is for this reason that it is preferable to provide the thermal sensing device 35 to visually indicate the temperature of the liquid F. To compensate the amount of rotation of the armature coil 20 for the temperature of the fluid being tested, a selector switch 46 is provided. The casing of the switch may be supported from the back wall 12 of the case 10 in any suitable manner. The switch includes three contacts 47, 48 and 49 (see FIG. 5) and a rotatable switch arm 50 supported on a shaft 51.

The shaft 51 extends through an opening in the cover 11 and a knob 52 is removably connected to the shaft in usual manner, and is manually moved by the operator to selectively engage the switch arm 50 with any one of the contacts 47, 48 and 49. As seen in FIG. 5, the selector switch is interposed in the line L2, and in this respect the rod 32 is electrically connected by conductor 53 to the switch arm 50. Conductors 54, 55 and 56 respectively, connect the contacts 47, 48 to line L2. Interposed in the conductor 54 is a resistor 57 of a predetermined low value. A resistor 58 of higher value is interposed in the conductor 55, and a resistor 59 of still higher value is interposed in the conductor 56. The cover 11 is provided with the legends "*Lo*," "*Med*" and "*Hi*" to correspond respectively with the contacts 47, 48 and 49.

Figure 3:
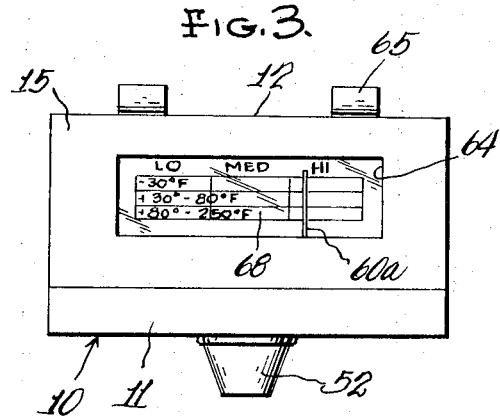

An indicator needle 60 is connected to the shaft 20.1 of the armature coil 20, as shown in FIGS. 4 and 5, and is adapted to sweep over a dial 61 which is supported from the rear wall 12 of the case 10. On the dial is a scale which is divided into three parts, each part designating a temperature range. The cover 11 has an opening 62 (which may be glass covered) so that the position of the needle 60 may be seen. A similar, but rectilinear, scale is carried by a dial 68 which is also supported from the rear wall, and the indicator needle 60 has a horizontal component 60a which sweeps over this scale so that the position of the needle component 60a may be seen through a glass covered opening 64 in the top wall 15 of the case 10, as shown in FIGS. 3 and 4. Spring clips 65 are connected to the upper portion of the rear wall 12 and provide means whereby the case may be clipped onto a shirt pocket of the operator.

To use the device, the operator removes the radiator cap and clamps the alligator clamp 30 onto the radiator lip 41, as shown in FIG. 5. Then, the operator inserts the rod 32 and the temperature sensing probe 37 into the liquid F in the radiator. After a very short interval of time, the operator may read the temperature of the liquid F on the thermal indicating device and will set the selector switch 46 in accordance. If acid is present in the liquid F, the galvanic current in the electrolyte (the liquid F) will cause the armature coil 20 to move in accordance with the amount of galvanic current in the circuit. Rotation of the armature coil 20 will swing the indicator needle 60 along the scale 61 (and the needle portion 60a over the scale 68) and the operator will read the scale portion that corresponds to the liquid temperature. The dials 61, 68 are provided with "*Lo*," "*Med*" and "*Hi*" legends to indicate the amount of acid present in the liquid F.

In order to read the dials 61, 68 for an alkaline content of the liquid F, the electrical connection to the opposite ends of the armature coil 20 must be reversed, and this may be simply accomplished by means of a reversing switch shown in FIG. 6, and which may be disposed within the case 10 with an operating knob (not shown) accessible from the cover 11. The reversing switch may include a blade 80 pivoted to a contact 81 and a further blade 82 pivoted to a contact 83. Line L2 is connected to the contact 81 and current passes through the blade 80 to a contact 84 which is electrically connected between the rod 32 and the switch arm 50 of the selector switch, and thus is adapted for connection with one end of the armature coil 20. Line L1 is connected to the contact 83 and current passes through the blade 82 to a contact 85 which is electrically connected to the opposite end of the armature coil 20. To change polarity, the blade 80 may be swung in the direction of arrow 86 to engage with contact 85, and blade 82 may be swung in the direction of arrow 87 to engage with contact 84.

FURTHER EMBODIMENT

FIG. 7 discloses a further embodiment of my invention for testing the acid or alkaline content of a liquid. In this embodiment, a sample of the liquid is drawn into a container which is in operative relation with a testing device such as that hereinbefore described. This embodiment makes it possible to test liquids from all types of containers and is therefore not limited to the testing of the cooling liquid of a radiator.

As seen in FIG. 7, a liquid-tight container 70 is connected to the rear wall of a testing device 71 such as hereinbefore described. Within the container are spaced plates 72, 73, one such as the plate 72 may be formed of brass, and the other may be formed of lead. A flexible tube 74 is connected to the lower end of the container 70 and its free end is adapted to be inserted into the liquid of any type of container. In FIG. 7, the tube 74 is shown as inserted through the "dip stick" opening 75 of an engine E with the free end of the tube disposed below the level of the oil in the engine. A second tube 76 is connected to the upper end of the container 70 and terminates in a rubber squeeze bulb 77. Thus, the operator may squeeze the bulb 77 to remove air therefrom, and then permit the bulb to return to normal shape so that it sucks a sample of oil from the engine, through the tube 74 and into the container 70, to act as the electrolyte between the plates 72, 73. Electrical connections are made with the operating portions of the indicating device 71 and, as seen in FIG. 7, the connection 78 to plate 72 represents that heretofore made by the alligator clamp 30 and the connection 79 (which is electrically isolated from the plate 73 in any suitable manner) represents that heretofore made by the rod 32 to the fluid between the plates. A suitable thermal probe, (not shown) may be disposed in position to be sensitive to the fluid in the container 70. The operation of the acid or alkaline indicating device 71 is the same as before described but in this embodiment, movement of the armature coil will be responsive to the galvanic current between the plates 72, 73.

I claim:

1. A hand tool for measuring the pH value of the cooling fluid in an engine having a radiator comprising:

a case of a size to be easily handled by a person,
an electric meter carried by said case and including a pointer movable over a scale,
a pair of electrodes of dissimilar metals, one being rod-like and adapted to be inserted through the filler opening of said radiator so that its free end is in contact with the cooling fluid therein, and the other being clamp-like and adapted to be connected to the metal defining the filler opening,
a first conductor connecting the end opposite the free end of said rod-like electrode to one terminal of said meter, and a second conductor connecting said clamp-like electrode to the other terminal of said meter, both conductors including insulated flexible portions supporting respective electrodes from said case and permitting manipulation of said electrodes for proper installation relative to said radiator.
said pointer being movable along said scale in accordance with the amount of galvanic current passing from one electrode, through said cooling fluid and to said other electrode,
a thermometer carried by said case, and a thermal sensing member supported by said case and connected to said thermometer,
said thermal sensing member extending from said case and having a free end adapted to be inserted through said filler opening and into contact with said cooling fluid.

2. The construction according to claim 1 and further including switch means and resistance means in circuit with said rod-like electrode and its meter terminal, whereby the resistance in such circuit may be changed in accordance with the temperature of said cooling fluid.

* * * * *